(12) United States Patent
Bartsch et al.

(10) Patent No.: US 8,474,285 B2
(45) Date of Patent: Jul. 2, 2013

(54) PROCESS FOR PRODUCTION OF GLASS TUBES HAVING AT LEAST ONE TUBE END SECTION OF REDUCED STRESS

(75) Inventors: Reiner Bartsch, Tirschenreuth (DE); Jens Ahrens, Stoernstein (DE); Markus Pappenberger, Wiesau (DE); Roland Fuchs, Mitterteich (DE)

(73) Assignee: Schott AG, Mainz (DE)

( * ) Notice: Subject to any disclaimer, the term of this patent is extended or adjusted under 35 U.S.C. 154(b) by 275 days.

(21) Appl. No.: 12/829,539

(22) Filed: Jul. 2, 2010

(65) Prior Publication Data
US 2011/0005275 A1   Jan. 13, 2011

(30) Foreign Application Priority Data
Jul. 9, 2009   (DE) .................. 10 2009 032 684

(51) Int. Cl.
*C03B 17/04*   (2006.01)
(52) U.S. Cl.
USPC ............. 65/87; 65/86; 65/56; 65/57; 65/63; 65/118
(58) Field of Classification Search
USPC ............. 65/56, 57, 63, 86, 87, 117, 118
See application file for complete search history.

(56) References Cited

U.S. PATENT DOCUMENTS

| 1,783,208 | A | * | 12/1930 | Williams | 65/119 |
| 2,166,871 | A | | 7/1939 | Luertzing | |
| 2,187,432 | A | * | 1/1940 | Powers | 65/21.4 |
| 2,553,136 | A | * | 5/1951 | Eisler | 83/879 |
| 3,837,830 | A | * | 9/1974 | Eberhart | 65/54 |
| 4,891,054 | A | * | 1/1990 | Bricker et al. | 65/105 |
| 4,936,891 | A | * | 6/1990 | Gunthner | 65/87 |
| 2007/0215195 | A1 | | 9/2007 | Buller et al. | |
| 2008/0041833 | A1 | * | 2/2008 | Cavallaro et al. | 219/121.85 |

FOREIGN PATENT DOCUMENTS

DE   10 2006 017 354   10/2007
GB   826 270   12/1959

* cited by examiner

*Primary Examiner* — Queenie Dehghan
(74) *Attorney, Agent, or Firm* — Michael J. Striker

(57) ABSTRACT

In the process a glass tube line is drawn from a glass tube production plant and the glass tube is severed from the glass tube line. At the same time the still heated glass tube is subjected to a selective local heat treatment of the at least one tube end section prior to cooling down completely in order to reduce the stresses in the respective tube end section. Not the entire glass tube but instead only the respective tube end section is subjected to the selective local heat treatment. The heat treatment is performed in particular in such a manner that the mechanical tensile stress in the region between 7 mm and 20 mm from the tube end or ends is reduced to below 6.0 MPa, more preferably to below 4.5 MPa.

31 Claims, 6 Drawing Sheets

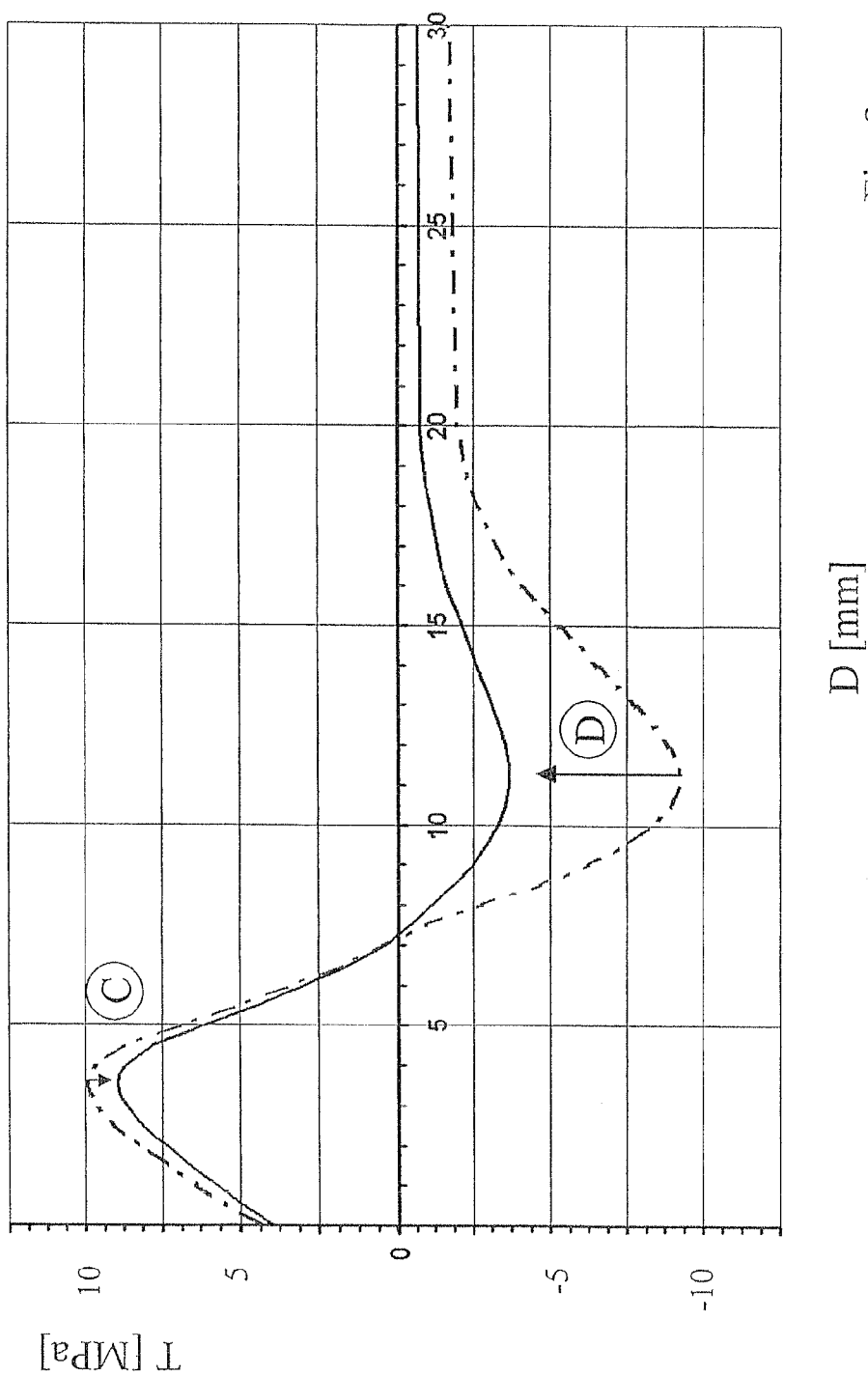

PROCESS FOR PRODUCTION OF GLASS TUBES HAVING AT LEAST ONE TUBE END SECTION OF REDUCED STRESS

CROSS-REFERENCE

The invention disclosed and claimed herein below is also described in German Patent Application No. 10 2009 032 684, entitled "A Process for the Production of Glass Tubes Having at least one Tube End Section of Reduced Stress", which was filed on Jul. 9, 2009 in Germany, the entire content of which is hereby expressly incorporated by reference. The aforesaid German Patent Application provides the basis for a claim of priority of invention for the invention described and claimed herein below under 35 U.S.C. 119 (a) to (d).

BACKGROUND OF THE INVENTION

1. The Field of the Invention

The present invention relates in general to the improvement of the fracture strength or tensile strength of end sections of glass tubes against mechanical or thermal loads, as they typically occur in the course of further processing at the respective end section, and relates in particular to a process for the production of glass tubes with reduced stress in or at at least one tube end, preferably in or at both tube ends, wherein according to a further aspect of the present invention the intention is to create a predetermined stress profile in at least one tube end section.

2. The Description of the Related Art

After being cut or cut to length from a glass tube stream, industrially produced glass tubes have a specific stress curve, such as is illustrated by way of example in FIG. 1a, in the region of the tube ends and after heating of the tube ends. This stress curve is the result of the cutting process used and is induced by subsequent fusing of the tube ends. The tube end described here lies by way of example in the region at a distance between 0 and 50 mm to the respective tube end.

If such a tube end is used directly and without appropriate post-treatment in a glass-to-metal joint, the result due to the steep gradient between tensile stress and compressive stress at the tube end after thermal processing, e.g. on heating with glass solder, is splitting off during the cooling process due to stress induction (also referred to as "ring fracturing" of the tube end.) This leads to the complete destruction of a glass-to-metal joint such as is illustrated by way of example in FIG. 3b and will be described in greater detail below.

In order nevertheless to use glass tubes for glass-to-metal joints the entire glass tube is subjected according to the prior art to what is referred to as precision cooling. For this purpose the entire glass tube passes, after being severed from the glass tube line and cooling to ambient temperature, into a separate oven in which the entire glass tube is subjected to a controlled heat treatment, i.e. a predetermined heat treatment with precisely defined heating and cooling curve. FIG. 1b illustrates the stress curve at a tube end of such a glass tube that is conventionally subjected to precision cooling. In the region of the arrows, as indicated by reference letters A and B, there is a significant reduction in the compressive stress (in region A) and tensile stress (in region B) as a result of the precision cooling.

There are cooling curves adapted to each type of glass that are supposed to bring about a reduction in the stress. The general doctrine says that for the stress relief of glass a time period of at least 15 min is required between the annealing point at a viscosity $\eta=10^{13.5}$ Pa s and the strain point at a viscosity $\eta=10^{12}$ Pa s to reduce the stress to such an extent that it is possible to process the glass safely (without breakage). Subsequently, the temperature of the glass item must be decreased at a rate of 2° C./min from the annealing point to the strain point. Such a precision cooling of glass tubes is therefore very time-consuming because several hours are usually needed for heating up and cooling down.

Such a precision cooling is also very costly and usually consumes a lot of energy. An annealing lehr is normally used for cooling glass or for controlling the stresses from the center of the tube towards the end of the tube. For this purpose a glass item or the glass tube is placed into the annealing lehr, passes through a predetermined cooling curve and is then removed from the lehr and packaged.

In addition, the atmosphere in conventional ovens used for precision cooling is relatively dirty with the result that the glass tubes have to be laboriously cleaned after the precision cooling, for instance if they have to be coated for a subsequent use.

One way out in order to eliminate these problems is to cut off and discard the respective tube end sections after cooling down completely to ambient temperature. However, this reduces efficiency and increases the costs of glass tube production.

U.S. Pat. No. 2,166,871 A describes a process in which a glass gob is continuously severed, in a heat-softened state, from a glass tube line (glass drawing line) and subsequently formed. Viscosities or temperatures around the working point at a viscosity $\eta=10^4$ Pa s are required for this purpose. The glass gob thus produced is subsequently subjected to a heat treatment that is not described in greater detail.

GB 826,270A discloses a process for severing glass tubes that is primarily used for large glass tube diameters. The glass tube, after local heating using burners, is heated until melted off by applying a very high electric voltage. Due to this very rapid local overheating, the severed glass tube must be heated up immediately after being severed to prevent stress cracks ("runners") induced by the high temperature difference. For this purpose the still heated glass tube is placed on a transport means which moves the glass tube past heating devices provided laterally. However, in this case there is no passage through a heating region with a predetermined temperature profile, which extends in the longitudinal direction of the glass tube and in which the temperature of the glass tube is selectively and locally increased depending on a distance to the respective tube end.

SUMMARY OF THE INVENTION

It is an object of the present invention is to provide a simple and efficient process for producing glass tubes by which glass tubes with reduced stress in at least one tube end section can be produced. According to a further preferred aspect of the present invention, the intention is to induce a predetermined stress profile with reduced stress overall in at least one end of a glass tube.

In a process according to the present invention the glass tube is severed or cut from a glass tube line (also called glass drawing line) with a predetermined length in a still heated condition (while still being at a temperature well above room temperature), normally at a relatively high temperature, and is subsequently transported through a heating region that extends in the longitudinal direction of the glass tube and in which at least one tube end section, preferably both tube end sections, but not the entire glass tube, is/are subjected to a selective local heat treatment that is designed so that the stresses in the respective tube end section can be reduced suitably, in particular by adaptation to the desired application in each case. This local heat treatment that according to the invention relates preferably only and exclusively to the region of the transformation range (glass transition temperature) Tg [° C.] or to viscosities of approximately $\eta=10^{13}$ dPa s to approximately $\eta=10^{14.5}$ dPa s (annealing point/strain point) after the production of a tube and being severed from the glass stream, may be carried out relatively quickly with respect to time. Test series of the inventor have shown that a local heat treatment lasting only a few minutes, sometimes considerably less than 2 minutes in length, is basically adequate to sufficiently reduce the stresses. According to the invention it is no longer necessary to adhere to a temperature gradient of 2° C./min for cooling down from the upper temperature to the strain point. As a result it is possible to reduce the energy expenditure and time expenditure considerably by comparison with precision cooling.

The process according to the present invention thus avoids the time-consuming and costly precision cooling, which is necessary in conventional processes according to the prior art, by a selective local heat treatment of the at least one tube end section in the heating region, wherein the stress profile, which results at the end regions of the symmetric glass body (e.g. tube, rod et cetera) in the course of its production, is selectively varied by means of the local heat treatment.

Moreover, according to the invention, additional expenditure for interim storage of glass tubes that have already cooled is also unnecessary. Elaborate test series of the inventor have also shown that contaminations of the glass tubes due to the atmosphere in the precision cooling oven can be significantly reduced according to the process according to the invention with the result that it is basically possible to dispense with further laborious cleaning of the glass tube surface prior to any subsequent use, e.g. for coating.

According to the invention, in particular it is no longer necessary to subject the entire glass tube to a controlled cooling process using an annealing lehr or similar. Rather a selective and specific local heat treatment of only the respective tube end sections is perfectly adequate for subsequent processing.

For this purpose the selective local heat treatment preferably may start at the interface between tensile stress and compressive stress or in their immediate vicinity, that is at the or close to the first passage through zero of the stress curve of an untreated glass tube according to FIG. 1a which may be defined accurately in advance on the basis of reference glass tubes. To do this, according to the invention, predetermined temperature conditions are specified selectively in this tube end section with a predetermined elongation in the longitudinal direction of the glass tube, which are able, despite the relatively short local heat treatment, to bring about a suitable reduction of stress, i.e. tensile and compressive stress, in this tube end section. According to the invention, there is no need in the remaining sections of the glass tube to ensure a selective heat treatment by precision cooling to reduce any residual stresses, which further reduces the energy expenditure and thus the process expenditure according to the invention.

According to a further embodiment, the glass tube when cut to size is transported further in a predetermined direction that is different from the direction in which the glass tube line is drawn from the upstream glass tube production plant, for example at right angles thereto, whereby the respective tube end section passes through a predetermined temperature profile for local heat treatment. This temperature profile can be varied locally and/or with respect to time during the local heat treatment in the longitudinal direction of the glass tube.

According to a preferred embodiment, the local temperature profile at the tube ends, when viewed in the longitudinal direction of the glass tube, includes a temperature maximum with a predetermined drop in temperature on both sides of the temperature maximum such that the temperature profile is usually symmetrical. The resulting temperature profile at the end of the heating path is produced by the local shift in the maxima due to moving the glass tube along the heating device.

According to further embodiments, it is possible however, when viewed in the longitudinal direction of the glass tube, also to provide two or a plurality of such temperature maxima. Such a temperature maximum may be implemented in a simple manner by a heating device that is disposed in the glass tube transport path at a predetermined distance from the respective glass tube end and at a predetermined distance from the surface of the glass tube, for example by means of one or a plurality of elongated gas burners, in particular a gas flame burner, or also by means of one or a plurality of electrical resistance heaters. A variation of the temperature profile with respect to time may be implemented in a simple manner by varying the energy supply to such a heating device.

According to a further embodiment, the temperature of the glass tube after being cut to length from the glass tube line up to passing through the predetermined temperature profile referred to previously does not fall below 200° C., preferably not below 300° C. which means that the energy expenditure for heating the tube ends can be further minimized.

For varying the temperature profile in the longitudinal direction of the glass tube with respect to time, it is possible according to a further embodiment to arrange a plurality of heating devices, viewed in the glass tube's direction of transport, i.e. preferably perpendicular or virtually perpendicular to the longitudinal direction of the glass tube, distributed along a curve at predetermined distances (spacings) from one another. Here the distance of the curve to the respective tube end viewed in the direction of transport may decrease continuously or alternatively, according to a less preferred embodiment, may basically also increase whereby the curve intersects the direction of glass tube transport at an acute angle in at least one place. The plurality of heating devices ensures local temperature maxima at various positions when viewed in the longitudinal direction of the glass tube. Since the glass tube is transported in a predetermined direction during the heat treatment, the respective temperature maximum thus passes continuously through the respective tube end section, when viewed in the longitudinal direction of the glass tube, and a resulting temperature profile arises together with cooling down which begins at the starting point. It is thus possible to influence the stress profile even more specifically. With sufficiently high temperatures at the tube end, this can still be used for fusing the cut edge (known as glazing).

Preferably, the curve is a straight line along which the heating devices are distributed at uniform distances (spacings) from one another, in which case the temperature maximum builds up at constant transport speed with constant speed in the longitudinal direction of the glass tube. Basically, however, different distances may also be provided between the individual heating devices or groups of heating devices.

The curve extends here in the longitudinal direction of the glass tube, preferably across a respective heating region in which the stresses are supposed to be decreased in a predetermined manner by means of the selective (specific) local heat treatment. As explained above, this heating region includes at least the stress curve's first passage through zero according to FIG. 1a, that is to say the region in which compressive and tensile stresses cancel or approximately cancel each other out in the case of an untreated glass tube. In this region, the temperature achieved locally on the glass tube may also reach the glass transition temperature ($T_g$) according to a further embodiment.

According to a further embodiment, the respective heating region at the at least one tube end section is shielded against the outside environment so that external influences, for example temperature changes or air flows, have no effect on the specific local heat treatment at the respective tube end section. For this purpose, the heating region may, for example, be formed as a box-shaped heating region that is shielded against the outside environment by appropriate walls, for example of a refractory material, for the purposes of insulation. When using individual gas burners or gas-heated burner strips, it is expedient to arrange the heating devices underneath the glass tube, thus the respective tube end section is locally heat-treated by the heat rising from the heating devices. The heat rising out of a heating region shielded in such a manner advisably discharges through an exhaust vent or similar which is formed above the glass tube. The heat from the respective heating region can be discharged through it so that the temperature conditions, in particular the temperature profile, may also be varied appropriately with respect to time in the respective heating regions. At the same time, the vent's cross-section may also be varied appropriately, for example to vary time constants for changing the temperature conditions.

According to a further embodiment, the glass tube is rotated at least in the region of the respective heating device at a predetermined angular speed that is preferably steady in order to ensure an even more uniform local heat treatment around the circumference of the tube.

According to a further embodiment, slipping of the glass tube in its longitudinal direction on transport during the selective local heat treatment is prevented, that is the position of the respective tube end, when viewed in the longitudinal direction of the glass tube, does not vary. Therefore the temperature profile may be specified even more accurately. Furthermore this prevents variations from tube to tube. For this purpose, the transport device for transporting the glass tube in the predetermined direction may have appropriate limiting means, limit stops for example, or an active open-loop or closed-loop control may be provided to fix the glass tube's position.

Elaborate test series of the inventor have also shown in particular that subsequent precision cooling or severing of the tube end is not necessary if it is possible to reduce the tensile stress in the respective tube end section, particularly in the region between 7 and 20 mm distant from the respective tube end, to below 4.5 MPa which can be achieved by appropriate selection of the temperature conditions during the selective (specific) local heat treatment.

According to a further aspect of the present invention, a predetermined stress profile is induced in the respective tube end section. For this purpose, the stress profile of a glass tube produced previously is measured using a suitable measuring apparatus and the parameters of the local heat treatment, in particular the temperature profile and its time-related and/or local variation, is selectively modified, that is to say controlled (open or closed loop), in such a manner that the desired predetermined stress profile can be achieved for glass tubes that are locally heat-treated with the appropriately modified temperature conditions.

Preferably, the glass tube produced according to the present invention is used for glass-to-metal joints, in particular for those in which a glass solder is used for joining a tube end to a metal end cap, or also for applications of glass tubes in photovoltaics, for example for elongated photovoltaic cells such as are described for example in US 2007/0215195 A1, the contents of which are explicitly incorporated herein by way of reference for the purposes of disclosure.

BRIEF DESCRIPTION OF THE DRAWING

The invention will be described in the following in an exemplary manner and with reference to the associated drawing, from which will ensue further features, advantages and objects to be achieved, in which:

FIG. 2 is a stress profile of a glass tube according to a first embodiment of the present invention;

FIG. 3b is a glass-to-metal joint for the glass tube according to FIG. 3a; and

Identical reference numerals in the figures indicate identical elements or element groups or those having substantially the same technical effect.

DETAILED DESCRIPTION OF PREFERRED EMBODIMENTS

In a process according to the invention, the glass tube after being cut to size from a glass tube line is subsequently stress-relieved on its ends in a post-processing line. For this purpose, a selective local heat treatment is carried out at a respective end of the glass tube. According to FIG. 4, a glass tube 1 with a predetermined length is severed in glass tube cutting machine (plant) 28 from a glass tube line 25 which is drawn continuously by means of a glass tube drawing bench 27 (using, for example, a Danner process, Vello process or down-draw process). In the downstream post-processing line, the glass tube 1 is transported away by means of a transport device 11 in the predetermined direction at a constant speed v or, where necessary, also at a varying time-related speed v, wherein the transport device 11 is configured such that the position of the tube end, when viewed in the longitudinal direction of glass tube 1, is not variable.

Figure 4:
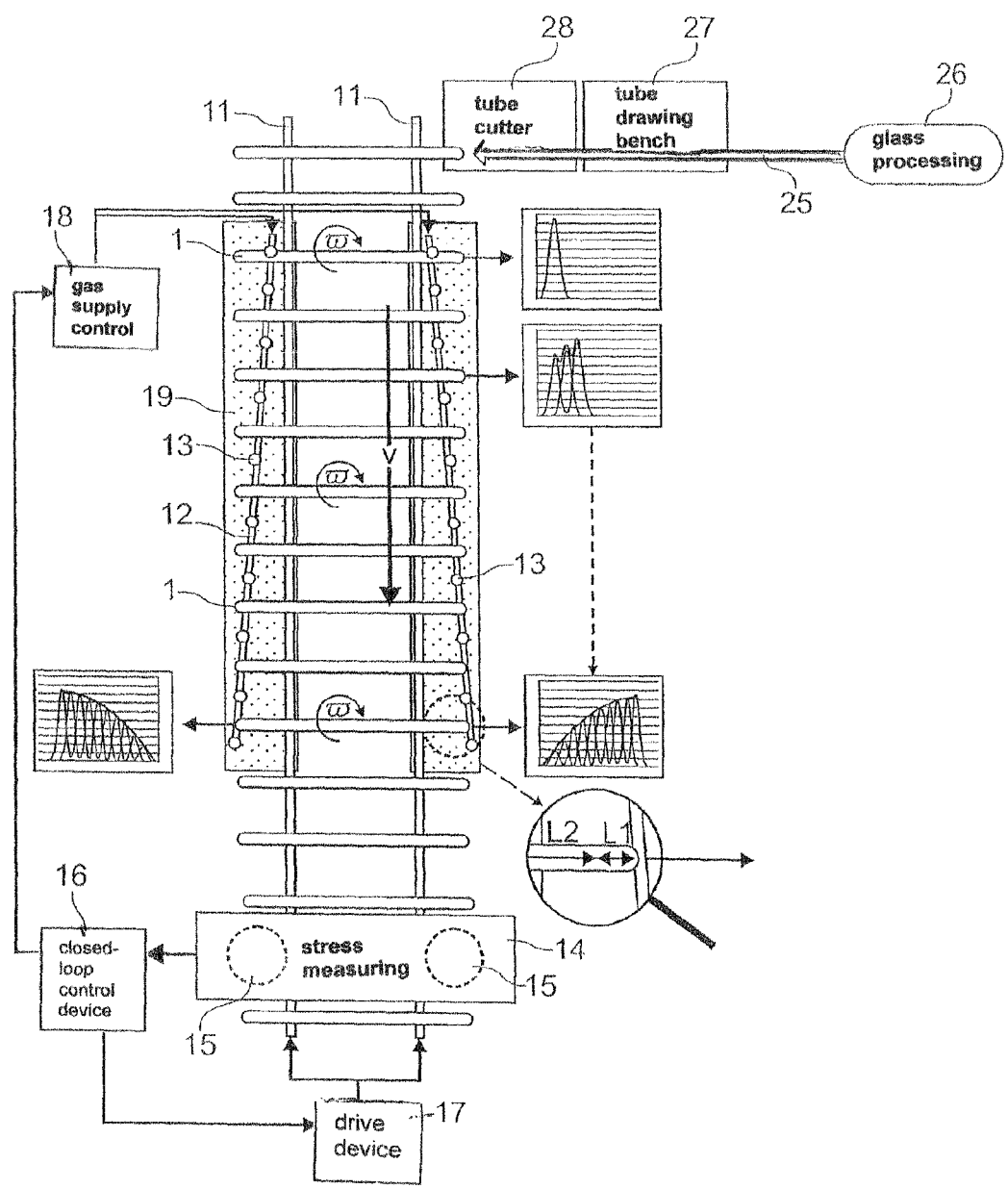
FIG. 4 is a schematic block diagram of an example of a process according to the invention with simultaneous processing of both tube ends.

According to FIG. 4, a plurality of heating devices 13 are disposed along straight lines 12, distributed at equal distances from each other. The heating devices 13 may be a plurality of gas flame burners or burner strips in which case straight line 12 corresponds to a gas pipe for supplying gas to the gas flame burners. According to FIG. 4, straight line 12 crosses the predetermined direction of transport of glass tube 1 at an acute angle. In the embodiment, straight line 12 runs continuously outwards at the acute angle referred to above relative to the transport direction, i.e. towards the respective tube end. Each of the heating devices 13 generates locally a temperature maximum which decreases on both sides, when viewed in the longitudinal direction of glass tube 1. This is illustrated by way of example in the topmost insert which shows the temperature profile on the surface of the glass tube as a function of the position on the glass tube in its longitudinal direction for a single heating device. As the glass tube 1 is constantly moved past heating devices 13 one after another, the temperature profile generated by the respective heating devices 13 passes through the respective glass tube end section in FIG. 4 towards the end of the glass tube. As illustrated in the second insert from above in FIG. 4, an envelope for the temperature profile arises due to three heating devices 13 on the surface of the glass tube, i.e. an effective temperature profile that rises towards the respective end of the glass tube. As illustrated in the bottom-most insert, overall an effective temperature profile arises which increases continuously in the illustrated embodiment towards the respective end of the glass tube.

Figure 1A:
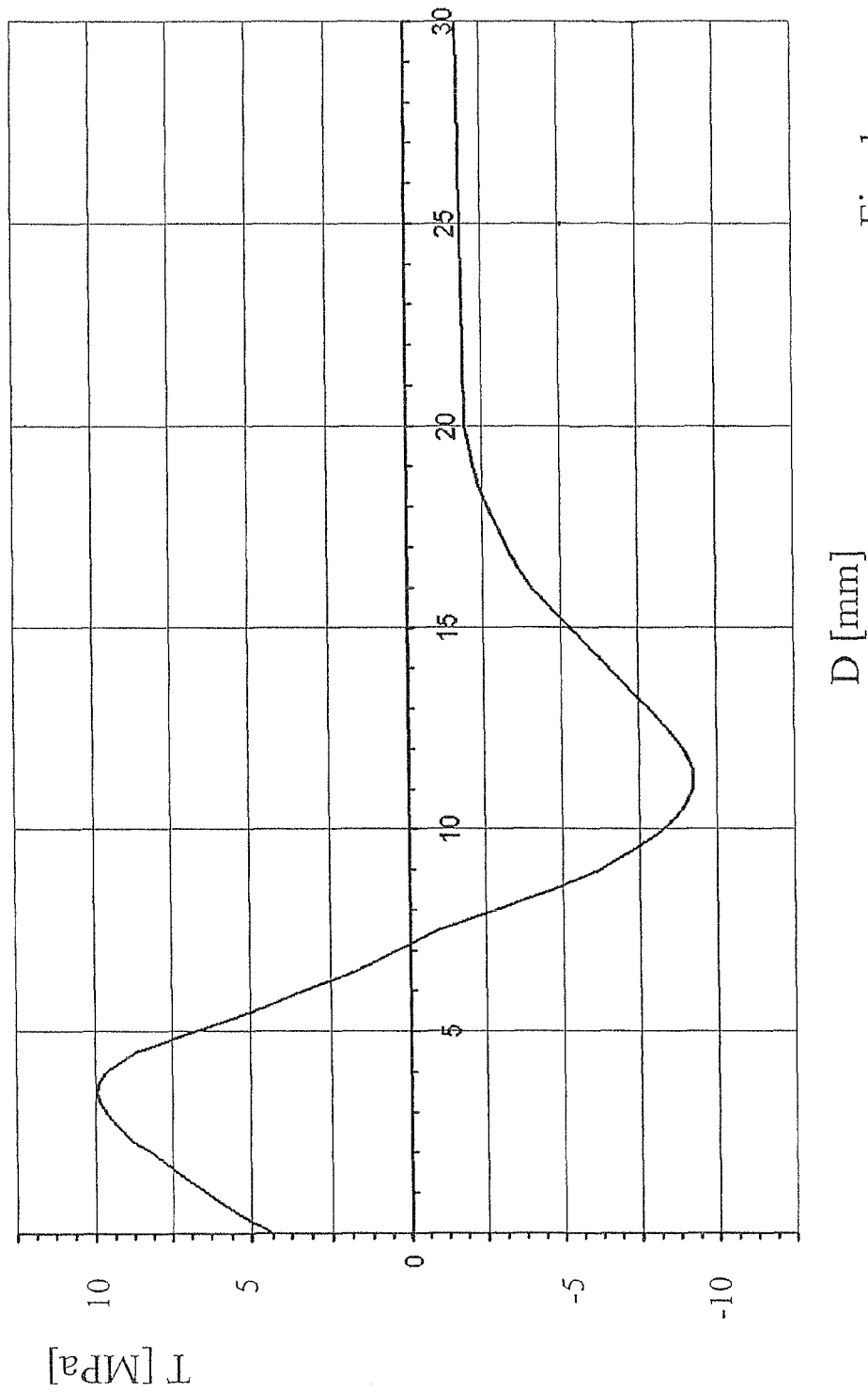
FIG. 1a is a stress profile at the end of a glass tube after being severed from the glass tube line, the glass tube being produced using a conventional production process without subsequent heat treatment.
Figure 1B:
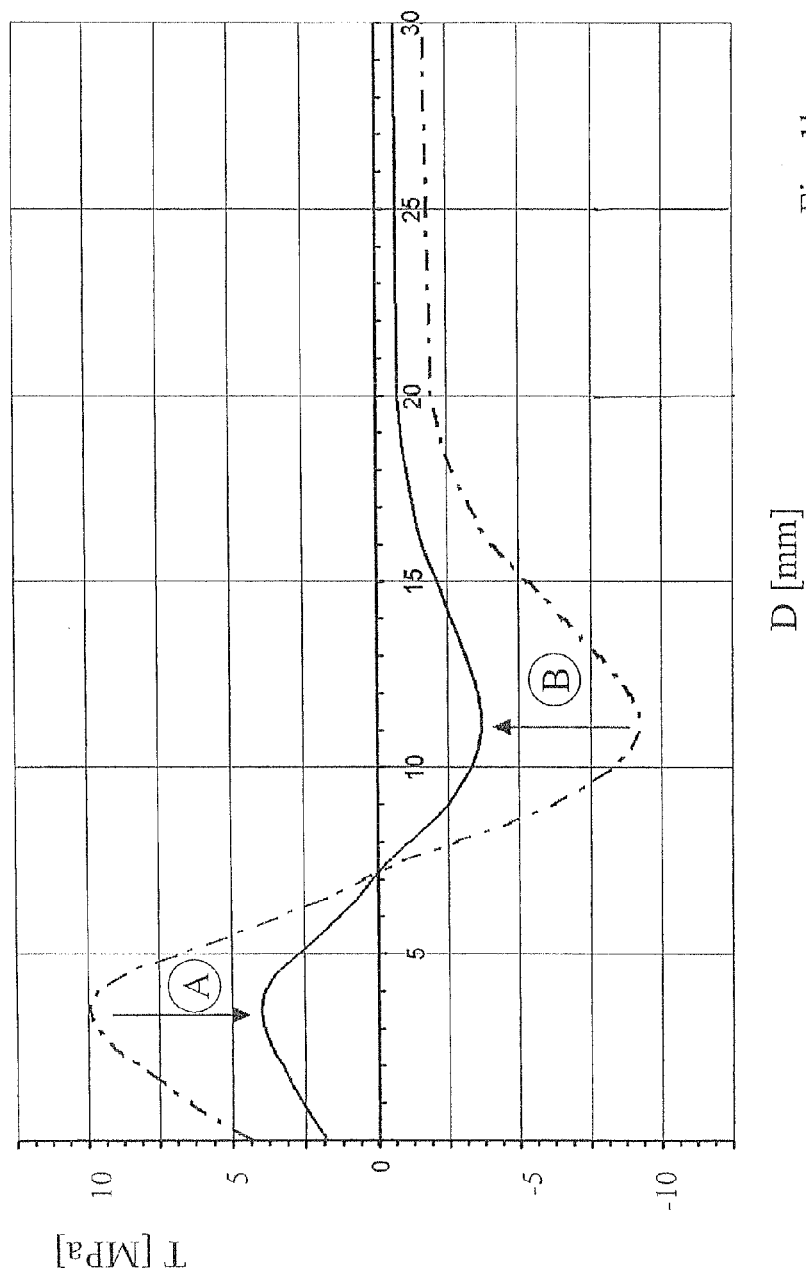
FIG. 1b is a stress profile of a glass tube that has been subjected to subsequent precision cooling according to the prior art.

The straight line 12 at least sweeps the region, when viewed in the longitudinal direction of the glass tube, in which the passage through zero of the stress profile of a still untreated glass tube would lie (cf. FIG. 1a). In particular, the heating region is specified such that heat can be supplied quickly and selectively to the end of the glass tube between 7 and 20 mm from the respective end in order to reduce tensile stresses in this region to below 6.0 MPa. According to another more preferred embodiment the heating region is induced such that heat can be supplied quickly and selectively to the end of the glass tube between 7 and 20 mm from the respective end in order to reduce tensile stresses in this region to below 4.5 MPa. On passing through the temperature profile from inside to the tube end, the heated tube end can still be fused at the end of the cooling process (known as glazing) so that the end of the glass tube can be used even better and more reliably in an appropriately prefabricated cap, in particular of metal and provided with a groove on the face for receiving the front end of the glass tube, and can be received therein.

Heating devices 13 are disposed underneath glass tubes 1 and transport device 11 so that the heat generated by them escapes upwards. Heating region L2 is preferably shielded and insulated against the outside environment by a housing of an appropriate refractory material (not illustrated), wherein one or a plurality of exhaust vents is provided above glass tube 1 in such a manner that the heat given off by heating devices 13 can escape upwards. Heating devices 13 may be long flame burners or burner strips that can deliver their heat to the end of the glass tube locally in a limited manner. These burners emit a long and relatively narrow (only a few millimeters wide) flame front which enables a very high local energy density. The long flame burners are disposed at a predetermined angle to the predetermined transport direction. This reduces the risk of a local overheating. Basically, it is also possible to use gas burners with a porous combustion chamber, such as are disclosed for example in German patent application DE 10 2006 017 354 A1 of the applicant, the content of which is expressly incorporated in the present application by way of reference. Alternatively, it is also basically possible to use electric heating devices that are mounted above and/or below.

Heating devices 13 may be supplied with different amounts of energy to achieve a desired temperature or stress profile. For this purpose, an appropriate control device 18 is provided that can, for example, control or regulate the respective gas supply to the gas burners. The rate of motion can also be varied in the transport direction for specifying the desired temperature or stress profile for which purpose an appropriate open-loop or closed-loop control 17 that can also control or regulate individual transport devices (not shown) is assigned to transport device 11.

During the process, the glass tubes fixed on the post-processing line are moved, whilst rotating evenly, through the heating zone generated by the burners. By stopping the movement, glass tube 1 is prevented from slipping on the post-processing line and thus resulting in the whole tube end being heated. The rotation of glass tube 1 ensures even heating on all sides.

According to FIG. 4, disposed at the end of the post-processing line in measuring region 15 is a measuring device 14 for measuring or determining the stress profile in a respective tube end. The stress profile measured in each case is sent to a central open-loop or closed-loop control device 16. Based on a reference stress profile stored therein and based on appropriate open-loop or closed-loop control parameters and curves, it is possible to vary appropriately parameters which define the selective local heat treatment, such as the respective temperature profile of heating devices 13 and its curve with respect to time, energy supply to the respective heating devices, transport speed v in the predetermined direction in which the glass tube cut from the glass tube line is transported, rotational speed w of the glass tube, in order to achieve the desired reference stress profile. This can be determined for glass tubes produced subsequently and can be compared with the stress profile of a previous batch. Thus by means of appropriate open-loop or closed-loop control it is ultimately possible to induce or at least approximate a desired stress profile.

FIG. 2 illustrates by way of example the stress curve of a glass tube that is produced in accordance with a process according to the present invention. By comparison, the dash-and-dot line in FIG. 2 illustrates the stress curve of a glass tube that was produced in the conventional manner and was not heat-treated. While only a slight reduction of the compressive stress has occurred in region C, in the region following the passage through zero (at around 7 mm away from the end of the tube), that is in region D, which for example is between 7 and 20 mm away from the respective end of the tube, the tensile stress is reduced to below 4.5 MPa. Elaborate test series of the inventors have shown that for most applications with glass-to-metal joints it might be sufficient if the tensile stress is reduced to below 4.5 MPa within the said region D as mentioned above.

Figure 3A:
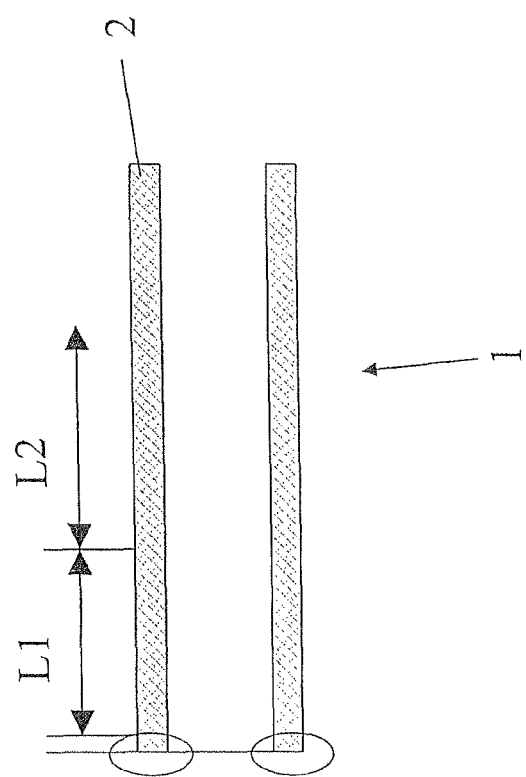
FIG. 3a is a glass tube end section in a glass tube that is produced using a process according to the invention.

FIG. 3a shows a further embodiment for a glass tube that is produced in accordance with a process according to the present invention. In region L1, i.e. approximately 2 to 10 mm away from the respective end of the tube, the compressive strength ranges between approximately 6 and 15 MPa. In region L2, i.e. in the region approximately 7 to 20 mm away from the respective end of the tube, the respective tensile stress is reduced to approximately 4.5 MPa. The position of the above-mentioned passage through zero of the stress is exemplary and in particular dependent on the tube diameter.

Figure 3B:
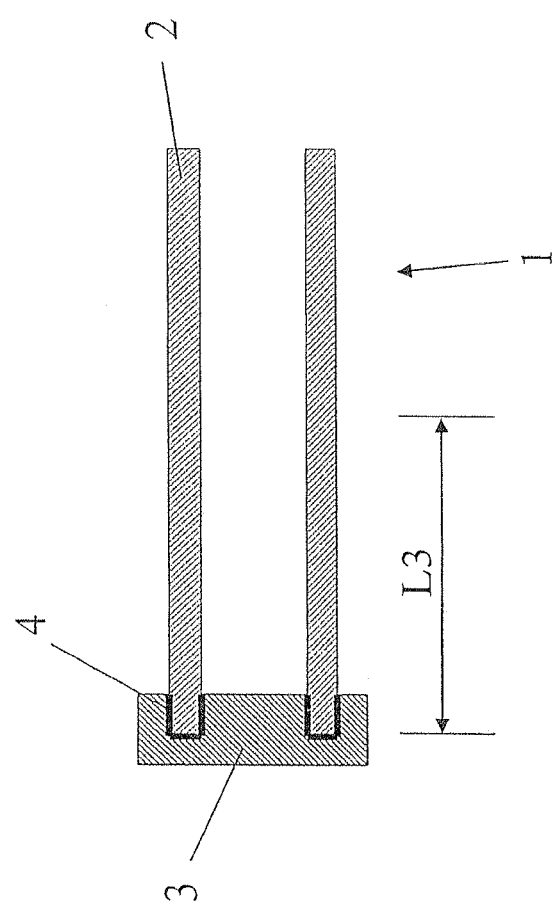

Glass tubes produced in such a way may be used according to the invention for glass-to-metal joints, as these are illustrated by way of example in FIG. 3b. According to FIG. 3b the end of the tube in region L3, for example 0 to 50 mm away from the respective end of the tube, has been selectively and locally heat-treated in accordance with a process according to the present invention. A metal cap 3 is mounted on the end of the tube. A glass solder 4 for joining glass tube 1 with end cap 3 may be introduced into the annular groove of metal cap 3 and cap 3 can be fused to glass tube 1.

Such glass-to-metal joints are required in particular for applications of glass tubes in photovoltaics, such as are disclosed by way of example in US 2007/0215195 A1, the entire content of which is expressly incorporated in the present application by way of reference.

Although it was explained above that the tensile stress at or in the respective glass tube end section is reduced below 6.0 MPa, more preferably below 4.5 MPa, in particular within the afore-mentioned region at a distance between 7 millimeters and 20 millimeters away from the respective tube end, the value of the tensile stress and/or the aforementioned distance can in general also depend on the wall thickness or on the outer diameter of the glass tube so that the present invention most preferably is not delimited at all to the afore-mentioned specific parameter ranges or values. Instead, these parameter ranges or values are based on typical glass tube dimensions as they are typically employed for forming a glass-to-metal-joint for applications in photovoltaics or the exploitation of solar thermal energy.

As will become apparent to a person skilled in the art when studying the foregoing, although it was explained above that the selective local heat treatment is carried out at both ends of a glass tube in a similar manner, it may also basically be sufficient to carry out such a local heat treatment at only one end of a glass tube. The local heat treatments at both ends of the glass tube also need not be carried out identically; rather it is also possible to use different parameters for the local heat treatment. The local heat treatment at both ends of the glass tube also need not be carried out simultaneously but may also be carried out after one another locally and in respect of time.

PARTS LIST

1 Glass tube
2 Glass tube wall
3 Metal cap
4 Glass solder
11 Transport device
12 Gas inlet/gas pipe
13 Gas burner/burner strips/long flame burner
14 Stress measuring device
15 Measuring range of stress measuring device 14
16 Closed-loop or open-loop control device
17 Drive device
18 Gas supply control device
19 Box-shaped heating region
25 Glass tube stream
26 Glass processing
27 Glass tube drawing bench
28 Glass tube cutting machine While the invention has been illustrated and described as embodied in a process for production of glass tubes having at least one tube end section of reduced stress, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed is new and is set forth in the following appended claims.

What is claimed is:

1. A process of producing a glass tube having at least one tube end section with a reduced stress, said process comprising the steps of:
   a) drawing a glass tube line from a glass tube production plant;
   b) cutting a glass tube from the glass tube line to form a still heated glass tube, said glass tube extending in a longitudinal direction; and
   c) transporting the still heated glass tube, after being cut from the glass tube line, in a predetermined direction that is different from a tube drawing direction and passing the still heated glass tube through a heating region with a predetermined temperature profile in which the still heated glass tube is subjected to a local heat treatment at said at least one tube end section prior to cooling down completely, so that in said heating region a respective temperature of the glass tube is selectively and locally increased depending on a corresponding distance from a tube end of said at least one tube end section, said heating region extending in the longitudinal direction of the glass tube;
   d) distributing heating devices along said predetermined direction in the heating region, wherein the heating devices are arranged at predetermined positions along a curve or straight line, wherein a distance between the curve or the straight line and the tube end of the at least one tube end section decreases continuously along the predetermined direction and wherein the curve or the straight line intersects the predetermined direction at an acute angle in one location;
   whereby stresses in said at least one tube end section are reduced.

2. The process according to claim 1, wherein the heating region extends in the longitudinal direction of the glass tube at least over said at least one tube end section in which the stresses are reduced.

3. The process according to claim 1, wherein said respective temperature of said glass tube during the local heat treatment is between an annealing point and a strain point of the glass tube.

4. The process according to claim 1, wherein said respective temperature of said glass tube during the local heat treatment is in a temperature range in which the glass tube has a viscosity between $\eta=10^{12}$ Pa s and $\eta=10^{13.5}$ Pa s.

5. The process according to claim 1, wherein prior to passing through the heating region with the predetermined temperature profile said respective temperature of said glass tube is at least 200° C.

6. The process according to claim 5, wherein said temperature prior to passing through the heating region is at least 300° C.

7. The process according to claim 1, wherein the glass tube is moved in the predetermined direction at a predetermined constant speed or with a predetermined speed profile.

8. The process according to claim 1, wherein the glass tube is transported in the predetermined direction so that a movement component is always infinitesimal in a direction perpendicular to the predetermined direction.

9. The process according to claim 1, wherein the heating devices are distributed at uniform distances from one another along said straight line.

10. The process according to claim 1, wherein different amounts of energy are applied to the moving glass tube by the heating devices.

11. The process according to claim 1, wherein the heating devices apply heat to the moving glass tube so that said respective temperature increases in a direction towards the tube end of the at least one tube end section, when said glass tube approaches an end of said heating region during the transporting in the predetermined direction.

12. The process according to claim 1, wherein the heating devices are gas burners that are disposed underneath the glass tube.

13. The process according to claim 12, further comprising rotating the glass tube about a longitudinal axis thereof at a predetermined constant angular speed, at least in the vicinity of the gas burners.

14. The process according to claim 1, further comprising shielding and/or insulating the heating region from an outside environment.

15. The process according to claim 14, wherein the heating region is box-shaped, and further comprising discharging heat generated in the heating region by the heating devices via chimney-shaped exhaust hoods above the moving glass tube.

16. The process according to claim 1, wherein the local heat treatment of the at least one tube end section is carried out so that a tensile stress in the at least one tube end section is reduced to below 6.0 MPa.

17. The process according to claim 16, wherein the local heat treatment is carried out so that the tensile stress is reduced to below 4.5 MPa.

18. The process according to claim 17, wherein the local heat treatment at the at least one tube end section takes place so that the tensile stress in a region spaced between 7 mm and 20 mm from the at least one tube end section is below 6.0 MPa.

19. The process according to claim 18, wherein the tensile stress is reduced in said region spaced between 7 mm and 20 mm from the at least one tube end section to below 4.5 MPa.

20. A process of producing a glass tube having at least one tube end section with a reduced stress, said process comprising the steps of:
   a) drawing a glass tube line from a glass tube production plant;
   b) cutting a glass tube from the glass tube line to form a still heated glass tube, said glass tube extending in a longitudinal direction; and
   c) transporting the still heated glass tube, after being cut from the glass tube line, in a predetermined direction that is different from a tube drawing direction and passing the still heated glass tube through a heating region with a predetermined temperature profile in which the still heated glass tube is subjected to a local heat treatment at said at least one tube end section prior to cooling down completely, so that in said heating region a respective temperature of the glass tube is selectively and locally increased depending on a corresponding distance from a tube end of said at least one tube end section, said heating region extending in the longitudinal direction of the glass tube;
   d) distributing heating devices along said predetermined direction in the heating region, wherein the heating devices are arranged at predetermined positions along a curve or straight line, wherein a distance between the curve or the straight line and the tube end of the at least one tube end section decreases continuously along the predetermined direction and wherein the curve or the straight line intersects the predetermined direction at an acute angle in one location, so that stresses in said at least one tube end section are reduced;
   e) measuring said stresses within said at least one tube end section; and
   f) varying said local heat treatment as a function of the stresses measured during the measuring of step e) so as to obtain a predetermined stress profile.

21. A process of producing a glass tube having at least one tube end section with a reduced stress, said process comprising the steps of:
   a) drawing a glass tube line from a glass tube production plant;
   b) cutting a glass tube from the glass tube line to form a still heated glass tube, said glass tube extending in a longitudinal direction;
   c) transporting the still heated glass tube, after being cut from the glass tube line, in a predetermined direction that is different from a tube drawing direction and passing the still heated glass tube through a heating region with a predetermined temperature profile in which the still heated glass tube is subjected to a local heat treatment at said at least one tube end section prior to cooling down completely, so that respective temperatures of the glass tube in said heating region at corresponding distances from a tube end of said at least one tube end section are selectively and locally increased depending on said corresponding distances from said tube end of said at least one tube end section, said heating region extending in the longitudinal direction of the glass tube; and
   d) distributing heating devices along said predetermined direction in the heating region so that the heating devices apply heat to the moving glass tube and said respective temperatures increase in a direction towards the tube end of the at least one tube end section when said glass tube approaches an end of said heating region during the transporting in the predetermined direction;
   whereby stresses in said at least one tube end section are reduced.

22. The process according to claim 21, wherein different amounts of energy are applied to the moving glass tube by the heating devices.

23. The process according to claim 21, wherein the heating region extends in the longitudinal direction of the glass tube at least over said at least one tube end section in which the stresses are reduced.

24. The process according to claim 21, wherein said respective temperature of said glass tube during the local heat treatment is between an annealing point and a strain point of the glass tube.

25. The process according to claim 21, wherein said respective temperature of said glass tube during the local heat treatment is in a temperature range in which the glass tube has a viscosity between $\eta=10^{12}$ Pa s and $\eta=10^{13.5}$ Pa s.

26. The process according to claim 21, wherein the glass tube is moved in the predetermined direction at a predetermined constant speed or with a predetermined speed profile.

27. The process according to claim 21, wherein the glass tube is transported in the predetermined direction so that a movement component is always infinitesimal in a direction perpendicular to the predetermined direction.

28. The process according to claim 21, wherein the heating devices are gas burners that are disposed underneath the glass tube.

29. The process according to claim 28, further comprising rotating the glass tube about a longitudinal axis thereof at a predetermined constant angular speed, at least in the vicinity of the gas burners.

30. A process of producing a glass tube having at least one tube end section with a reduced stress, said process comprising the steps of:
   a) drawing a glass tube line from a glass tube production plant;
   b) cutting a glass tube from the glass tube line to form a still heated glass tube, said glass tube extending in a longitudinal direction;
   c) transporting the still heated glass tube, after being cut from the glass tube line, in a predetermined direction that is different from a tube drawing direction and passing the still heated glass tube through a heating region with a predetermined temperature profile in which the still heated glass tube is subjected to a local heat treatment at said at least one tube end section prior to cooling down completely, so that respective temperatures of the glass tube in said heating region at corresponding distances from a tube end of said at least one tube end section are selectively and locally increased depending on said corresponding distances from said tube end of said at least one tube end section, said heating region extending in the longitudinal direction of the glass tube;
d) distributing heating devices along said predetermined direction in the heating region so that the heating devices apply heat to the moving glass tube and said respective temperatures increase in a direction towards the tube end of the at least one tube end section when said glass tube approaches an end of said heating region during the transporting in the predetermined direction;
e) measuring said stresses within said at least one tube end section; and
f) varying said local heat treatment as a function of the stresses measured during the measuring of step d) so as to obtain a predetermined stress profile.

31. A process of producing a glass tube having at least one tube end section with a reduced stress, said process comprising the steps of:
a) drawing a glass tube line from a glass tube production plant;
b) cutting a glass tube from the glass tube line to form a still heated glass tube, said glass tube extending in a longitudinal direction;
c) transporting the still heated glass tube, after being cut from the glass tube line, in a predetermined direction that is different from a tube drawing direction and passing the still heated glass tube through a heating region with a predetermined temperature profile in which the still heated glass tube is subjected to a local heat treatment at said at least one tube end section prior to cooling down completely, so that respective temperatures of the glass tube in said heating region at corresponding distances from a tube end of said at least one tube end section are selectively and locally increased depending on said corresponding distances from said tube end of said at least one tube end section, said heating region extending in the longitudinal direction of the glass tube;
d) distributing heating devices along said predetermined direction in the heating region so that the heating devices apply heat to the moving glass tube and said respective temperatures increase in a direction towards the tube end of the at least one tube end section when said glass tube approaches an end of said heating region during the transporting in the predetermined direction;
so that said predetermined temperature profile varies locally and/or with respect to time in the longitudinal direction of the glass tube, so that stresses in said at least one tube end section are reduced to less than 6.0 MPa when said local heat treatment lasts less than 2 minutes.

* * * * *